(12) United States Patent
Aggarwal et al.

(10) Patent No.: US 7,986,733 B2
(45) Date of Patent: *Jul. 26, 2011

(54) TERTIARY CONTENT ADDRESSABLE MEMORY BASED MOTION ESTIMATOR

(75) Inventors: Gaurav Aggarwal, Bangalore (IN); Rajendra Khare, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1080 days.

This patent is subject to a terminal disclaimer.

(21) Appl. No.: 10/903,664

(22) Filed: Jul. 30, 2004

(65) Prior Publication Data

US 2006/0023784 A1    Feb. 2, 2006

(51) Int. Cl.
*H04N 11/02* (2006.01)
*H04N 7/12* (2006.01)
*H04N 11/04* (2006.01)

(52) U.S. Cl. .......................... 375/240.12; 375/240.24

(58) Field of Classification Search ............ 375/240.12, 375/240.24
See application file for complete search history.

(56) References Cited

U.S. PATENT DOCUMENTS

| | | | | |
|---|---|---|---|---|
| 4,622,585 A | * | 11/1986 | Reitsma | 375/240.12 |
| 5,587,954 A | * | 12/1996 | Vogley et al. | 365/221 |
| 6,008,849 A | * | 12/1999 | Frencken | 375/240.12 |
| 6,289,128 B1 | * | 9/2001 | Allen | 382/232 |
| 6,381,275 B1 | * | 4/2002 | Fukuhara et al. | 375/240.06 |
| 6,389,579 B1 | * | 5/2002 | Phillips et al. | 716/6 |
| 6,526,055 B1 | * | 2/2003 | Perlman et al. | 370/392 |
| 6,690,727 B1 | * | 2/2004 | Mehta | 375/240.12 |
| 6,885,705 B2 | * | 4/2005 | Arita et al. | 375/240.16 |
| 2005/0013374 A1 | * | 1/2005 | Kim | 375/240.21 |
| 2006/0159180 A1 | * | 7/2006 | Sekiguchi et al. | 375/240.17 |

* cited by examiner

*Primary Examiner* — Marsha D Banks Harold
*Assistant Examiner* — Jessica Prince
(74) *Attorney, Agent, or Firm* — McAndrews, Held & Malloy, Ltd.

(57) ABSTRACT

Presented herein are Tertiary Content Addressable Memory based motion estimator(s). In one embodiment, there is presented a method for encoding a picture. The method comprises addressing a first memory with one or more data words for a first prediction block, and addressing a second memory with one or more data words for a second prediction block while addressing the first memory.

16 Claims, 6 Drawing Sheets

| 0,0 | 0,1 | 0,2 | 0,3 | 0,4 | 0,5 | 0,6 | 0,7 | 0,8 | 0,9 | 0,10 | 0,11 | 0,12 | 0,13 | 0,14 | 0,15 |
|---|---|---|---|---|---|---|---|---|---|---|---|---|---|---|---|
| 1,0 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 |
| 2,0 | 2,1 | 2,2 | 2,3 | 2,4 | 2,5 | 2,6 | 2,7 | 2,8 | 2,9 | 2,10 | 2,11 | 2,12 | 2,13 | 2,14 | 2,15 |
| 3,0 | 3,1 | 3,2 | 3,3 | 3,4 | 3,5 | 3,6 | 3,7 | 3,8 | 3,9 | 3,10 | 3,11 | 3,12 | 3,13 | 3,14 | 3,15 |
| 4,0 | 4,1 | 4,2 | 4,3 | 4,4 | 4,5 | 4,6 | 4,7 | 4,8 | 4,9 | 4,10 | 4,11 | 4,12 | 4,13 | 4,14 | 4,15 |
| 5,0 | 5,1 | 5,2 | 5,3 | 5,4 | 5,5 | 5,6 | 5,7 | 5,8 | 5,9 | 5,10 | 5,11 | 5,12 | 5,13 | 5,14 | 5,15 |
| 6,0 | 6,1 | 6,2 | 6,3 | 6,4 | 6,5 | 6,6 | 6,7 | 6,8 | 6,9 | 6,10 | 6,11 | 6,12 | 6,13 | 6,14 | 6,15 |
| 7,0 | 7,1 | 7,2 | 7,3 | 7,4 | 7,5 | 7,6 | 7,7 | 7,8 | 7,9 | 7,10 | 7,11 | 7,12 | 7,13 | 7,14 | 7,15 |
| 8,0 | 8,1 | 8,2 | 8,3 | 8,4 | 8,5 | 8,6 | 8,7 | 8,8 | 8,9 | 8,10 | 8,11 | 8,12 | 8,13 | 8,14 | 8,15 |
| 9,0 | 9,1 | 9,2 | 9,3 | 9,4 | 9,5 | 9,6 | 9,7 | 9,8 | 9,9 | 9,10 | 9,11 | 9,12 | 9,13 | 9,14 | 9,15 |
| 10,0 | 10,1 | 10,2 | 10,3 | 10,4 | 10,5 | 10,6 | 10,7 | 10,8 | 10,9 | 10,10 | 10,11 | 10,12 | 10,13 | 10,14 | 10,15 |
| 11,0 | 11,1 | 11,2 | 11,3 | 11,4 | 11,5 | 11,6 | 11,7 | 11,8 | 11,9 | 11,10 | 11,11 | 11,12 | 11,13 | 11,14 | 11,15 |
| 12,0 | 12,1 | 12,2 | 12,3 | 12,4 | 12,5 | 12,6 | 12,7 | 12,8 | 12,9 | 12,10 | 12,11 | 12,12 | 12,13 | 12,14 | 12,15 |
| 13,0 | 13,1 | 13,2 | 13,3 | 13,4 | 13,5 | 13,6 | 13,7 | 13,8 | 13,9 | 13,10 | 13,11 | 13,12 | 13,13 | 13,14 | 13,15 |
| 14,0 | 14,1 | 14,2 | 14,3 | 14,4 | 14,5 | 14,6 | 14,7 | 14,8 | 14,9 | 14,10 | 14,11 | 14,12 | 14,13 | 14,14 | 14,15 |
| 15,0 | 15,1 | 15,2 | 15,3 | 15,4 | 15,5 | 15,6 | 15,7 | 15,8 | 15,9 | 15,10 | 15,11 | 15,12 | 15,13 | 15,14 | 15,15 |

120

| | | | | |
|---|---|---|---|---|
| 510(0) | 120(0,0) | 120(0,4) | 120(0,8) | 120(0,12) |
| 510(1) | 120(4,0) | 120(4,4) | 120(4,8) | 120(4,12) |
| 510(2) | 120(8,0) | 120(8,4) | 120(8,8) | 120(8,12) |
| 510(3) | 120(12,0) | 120(12,4) | 120(12,8) | 120(12,12) |

| | | | | |
|---|---|---|---|---|
| 505(0) | 120(0,0) XXXX | 120(0,4) XXXX | 120(0,8) XXXX | 120(0,12) XXXX |
| 505(1) | 120(4,0) XXXX | 120(4,4) XXXX | 120(4,8) XXXX | 120(4,12) XXXX |
| 505(2) | 120(8,0) XXXX | 120(8,4) XXXX | 120(8,8) XXXX | 120(8,12) XXXX |
| 505(3) | 120(12,0) XXXX | 120(12,4) XXXX | 120(12,8) XXXX | 120(12,12) XXXX |

FIGURE 5

| 100Y | | | | | | | |
|---|---|---|---|---|---|---|---|
| 0,0 | 0,1 | 0,2 | 0,3 | 0,4 | 0,5 | 0,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| : | : | : | : | : | : | : | : |

| 0,0 | 0,4 | 0,8 | 0,12 | 0,16 | 0,20 | 0,24 | ...... |
|---|---|---|---|---|---|---|---|
| 4,0 | 4,4 | 4,8 | 4,12 | 4,16 | 4,20 | 4,24 | ...... |
| : | : | : | : | : | : | : | : |

| 0,1 | 0,5 | 0,9 | 0,11 | 0,15 | 0,21 | 0,25 | ...... |
|---|---|---|---|---|---|---|---|
| 4,1 | 4,5 | 4,9 | 4,11 | 4,15 | 4,21 | 4,25 | ...... |
| : | : | : | : | : | : | : | : |

:
:

| 1,0 | 1,4 | 1,8 | 1,12 | 1,16 | 1,20 | 1,24 | ...... |
|---|---|---|---|---|---|---|---|
| 5,0 | 5,4 | 5,8 | 5,12 | 5,16 | 5,20 | 5,24 | ...... |
| : | : | : | : | : | : | : | : |

| 1,1 | 1,5 | 1,9 | 1,11 | 1,15 | 1,21 | 1,25 | ...... |
|---|---|---|---|---|---|---|---|
| 5,1 | 5,5 | 5,9 | 5,11 | 5,15 | 5,21 | 5,25 | ...... |
| : | : | : | : | : | : | : | : |

TERTIARY CONTENT ADDRESSABLE MEMORY BASED MOTION ESTIMATOR

RELATED APPLICATIONS

This application is related to the following applications:
(1) "Tertiary Content Addressable Memory Based Motion Estimator" a non-provisional application for U.S. patent Ser. No. 10/909,151, filed Jul. 30, 2004 by Gaurav Aggarwal, et al.
(2) "Tertiary Content Addressable Memory Based Motion Estimator," a non-provisional application for U.S. patent Ser. No. 10/900,159, filed Jul. 27, 2004 by Gaurav Aggarwal, et al.
Each of which are incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video encoding standards such as MPEG-2, ITU-H.264 (also known as MPEG-4, Part 10 and Advanced Video Coding) use motion compensation for compressing video data comprising a series of pictures. Motion compensation predicts a predicted picture from one or more reference pictures.

An encoder predicts a predicted picture by dividing the picture into smaller blocks of pixels. The encoder then searches pixels from the reference picture(s) for a similar block, known as a reference block. An identification of the reference block and the difference between the reference block and the predicted block, known as the prediction error, represent the predicted block.

Identification of the similar block in the reference picture is known as motion estimation. A memory stores the reference picture. The motion estimator searches the memory for a block that is similar to the reference block.

Motion estimation can potentially use a very large number of memory accesses for determining a reference picture. A high definition television (HDTV) video comprises 30 1920×1080 pixel pictures per second. A common block size can be, for example, a 16×16 block of pixels, Therefore, an exhaustive search may not be practical, especially for encoding in real time.

In one approach, the encoder may take a smaller number of samples of the block that are preferably sparsely scattered about the block. The motion estimator can then search the reference picture for the samples of the block. Although the foregoing may be faster than an exhaustive search, this can also be time-consuming and computationally intense.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are Tertiary Content Addressable Memory based motion estimator(s).

In one embodiment, there is presented a method for encoding a picture. The method comprises addressing a first memory with one or more data words for a first prediction block; and addressing a second memory with one or more data words for a second prediction block while addressing the first memory.

In another embodiment, there is presented a method for encoding a picture. The method comprises addressing a first memory with a first one or more data words for a first prediction block; and generating one or more data words for a second prediction block, said one or more data words being a function of one or more samples from a second prediction block, while addressing the first memory with the one or more data words for the first prediction block.

In another embodiment, there is presented a method for encoding a picture. The method comprises addressing a first memory with a first one or more data words for a prediction block; receiving one or more addresses from the first memory after addressing the first memory; writing one or more blocks associated with the one or more addresses to a second memory; and addressing the second memory with another one or more data words for the prediction block.

In another embodiment, there is presented a video encoder for encoding a picture. The video encoder comprises a first memory, a second memory, and a bus. The first memory stores pixels from a reference picture. The second memory stores pixels from one or more blocks of the reference picture. The bus addresses the first memory with one or more data words for a first prediction block and addresses a second memory with one or more data words for a second prediction block while addressing the first memory.

In another embodiment, there is presented a video encoder for encoding a picture. The video encoder comprises a first memory, a bus, and a register. The first memory stores a reference picture. The bus addresses the first memory with a first one or more data words for a first prediction block. The register generates one or more data words for a second prediction block, said one or more data words being a function of one or more samples from a second prediction block, while addressing the first memory with the one or more data words for the first prediction block.

In another embodiment, there is presented a video encoder for encoding a picture. The video encoder comprises a first memory, a bus, and a second memory. The first memory stores a reference picture. The bus addresses a first memory with a first one or more data words for a prediction block and receives one or more addresses from the first memory after addressing the first memory. The second memory stores one or more blocks associated with the one or more addresses, after receiving the one or more addresses. The bus addresses the second memory with another one or more data words for the prediction block.

These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 5 is a block diagram describing an exemplary reference picture stored in a memory in accordance with an embodiment of the present invention;

DETAILED DESCRIPTION OF THE INVENTION

Figure 1:
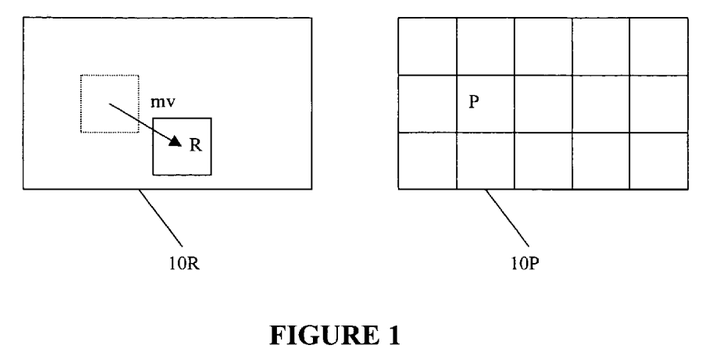
FIG. 1 is a block diagram of exemplary pictures.

Referring now to FIG. 1, there is illustrated an exemplary prediction picture 10P and reference picture 10R. Video data comprises a series of pictures 10 that are captured at short time intervals, such as 1/24 sec, or 1/30 sec. When the pictures 10 are displayed on a display device at similar time intervals, the pictures simulate motion picture.

Motion compensation is a technique for encoding video data. Motion compensation takes advantage of the fact that pictures taken during proximate times, e.g., prediction picture P and reference picture R, are likely to contain many similarities. Moreover, the differences between the pictures are likely to be due to displacement of objects within the pictures.

Therefore, a picture, known as a prediction picture 10P, can be divided into blocks P, known as prediction blocks. The prediction blocks P can be encoded as a prediction error E. The prediction error E is a block that when added to a reference block R, yield the prediction block P. Where the reference block R and the prediction block P are similar, the prediction error E can either be nil, or small. Generally, smaller prediction errors require less data. Therefore, it is preferable to find a reference block R that is similar to the prediction block P.

Accordingly, the reference picture 10R is searched for blocks that are similar to blocks P. A reference block R is selected, and the prediction block P is represented by an identifier that identifies the reference block R and the prediction error E. The reference block is identified by a motion vector mv. A motion vector mv describes the displacement between the prediction block P and the reference block R. Finding the reference block R in the reference picture 10R is known as motion estimation.

Figure 2:
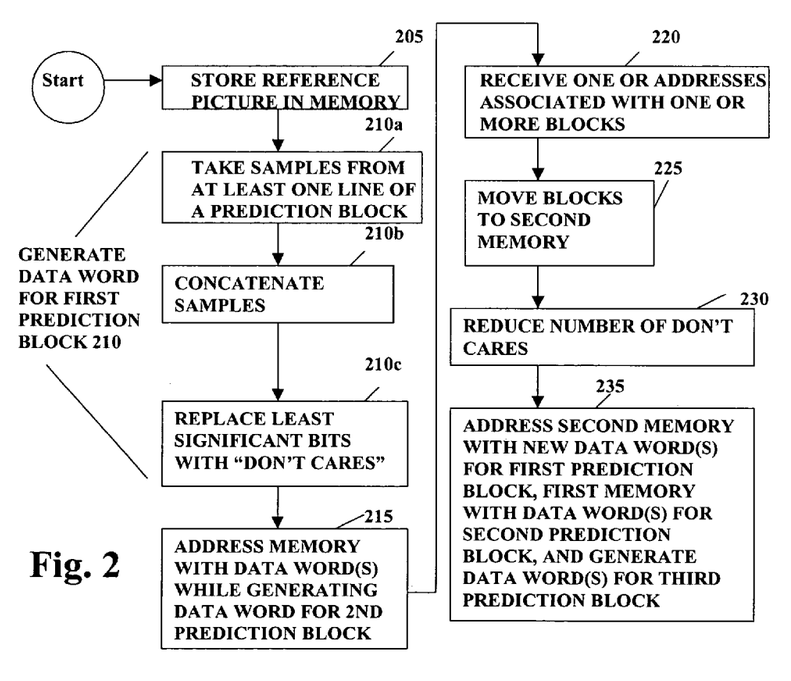
FIG. 2 is a flow diagram for encoding pictures in accordance with an embodiment of the present invention.

Referring now to FIG. 2, there is illustrated a flow diagram for encoding video data in accordance with an embodiment of the present invention. At 205, a reference picture is stored in a memory. The memory can comprise, for example, a content addressable memory (CAM) or a tertiary CAM (TCAM).

At 210, data words for the first prediction block are generated. According to certain aspects of the present invention, data words for the first prediction block can be generated by taking samples 210a from one or more lines of a first prediction block P, concatenating the samples (210b) and replacing (210c) the least significant bits of the samples with "don't cares".

The prediction block comprises portions of a plurality of lines of the luma, chroma red, and chroma blue pixels of the pictures. In one embodiment, sampling the portion of the line can include selecting pixels at intervals from the portion, the intervals having a certain period, T.

At 215, the memory is addressed with the data word(s) for the first prediction block, while data word(s) for a second prediction block are generated. One or more addresses associated with one or more blocks are received at 220. The one or more blocks are potential reference blocks for the prediction block, and are likely to yield minimal prediction error for the prediction block.

To select a reference block from the potential reference blocks, at 225 the one or more blocks are moved to a second memory. At 230 the number of the don't cares in the data word(s) for the first prediction block are reduced. The "don't cares" in the most significant bit positions are replaced by the corresponding least significant bits of the samples, thereby generating another data word(s).

At 235, the second memory is addressed with data word(s) for the first prediction block with the fewer "don't cares", while generating data word(s) for a third prediction block and addressing the first memory with the data word for the second prediction block.

Figure 3:
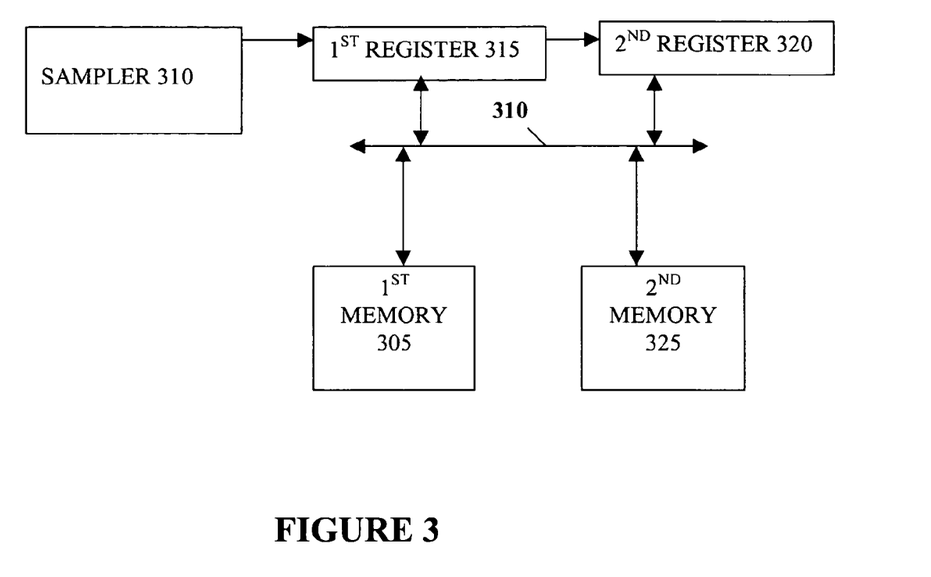
FIG. 3 is a block diagram of an exemplary video encoder in accordance with an embodiment of the present invention.

Referring now to FIG. 3, there is illustrated a block diagram describing an exemplary video encoder 300 in accordance with an embodiment of the present invention. The video encoder 300 comprises a first memory 305, a sampler 310, a first register 315, a second register 320, a second memory 325, a bus 330, and a controller 335.

The first memory 305 stores a reference picture. The first memory 305 and the second memory 325 can comprise, for example, a content addressable memory (CAM) or a tertiary CAM (TCAM). The sampler 310 takes samples from one or more lines of a first prediction block P. The prediction block comprises portions of a plurality of lines of the luma, chroma red, and chroma blue pixels of the pictures. In one embodiment, the sampler 310 selects pixels at intervals from the one or more lines, the intervals having a certain period, T.

The first register 315 generates data word(s) for the first prediction block that are a function of the samples taken by the sampler 310. Each of the pixel samples taken by the sampler 310 includes most significant bits and least significant bits. In one embodiment, the register 315 generates data words for each particular one of the one or more lines by concatenating the pixel samples from the particular line and replacing the least significant bits with what are known as "don't cares" X.

"Don't cares" indicate that the bits can either be a one "1" or zero "0". The bus 330 uses the data word(s) generated by first register 315 to address the first memory and returns one or more addresses. While the bus 330 addresses the first memory 305, the sampler 310 and the first register 315 generate one or more word(s) for a second prediction block.

The one or more addresses can be starting addresses from wherever the data word(s) for the first prediction block are stored. Blocks can be formed starting from the addresses. These blocks are potential reference blocks for the first prediction block P. The controller 335 writes the foregoing blocks to second memory 325.

The second register 320 receives the one or more data word(s) for the first prediction block from the first register 315. The second register 320 decreases the number of "don't cares" by replacing the "don't cares" in the most significant bit positions, with corresponding bits of the samples, thereby generating new data word(s). The bus 320 uses the new data word(s) for the first prediction block to address the second memory 325. According to certain aspects of the present invention, the bus 320 can address the second memory 325 with the new data word(s) for the first prediction block, while addressing the first memory 305 with the one or more data word(s) for the second prediction block. Additionally, the sampler 310 and the first register 315 can generate data word(s) for a third prediction block while the bus addresses the second memory 325 with the one or more data word(s) for the first prediction block, and addresses the first memory 305 with the one or more data word(s) for the second prediction block.

Embodiments of the present invention will now be explained in the context of the MPEG-2 and H.264 standards. Of course, it shall be understood that the invention is not limited to these standards, and can be applied to other standards as well.

MPEG-2, H.264

Figure 4:
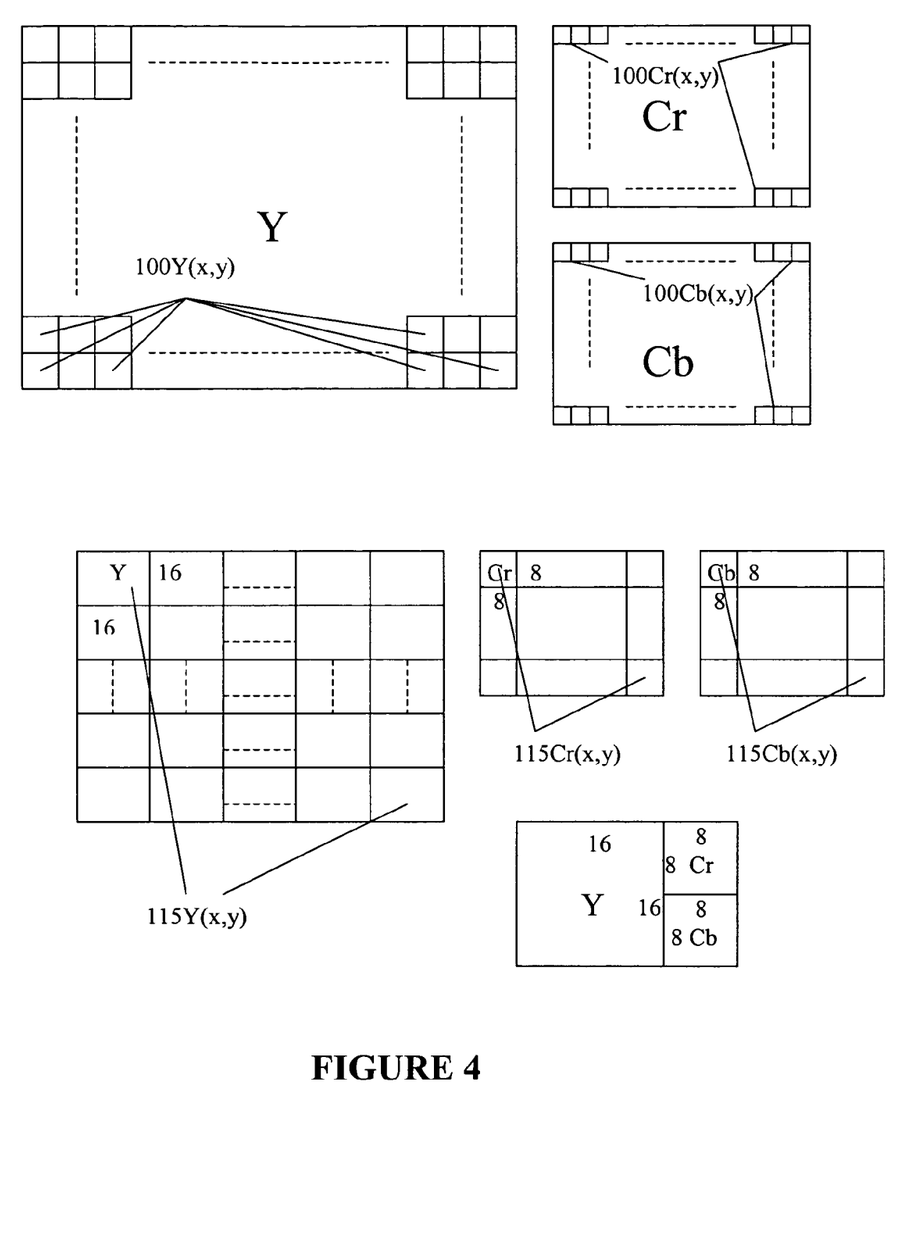
FIG. 4 is a block diagram describing the generation of a data word in accordance with an embodiment of the present invention.

Referring now to FIG. 4, there is illustrated a block diagram of a picture 100. A video camera captures pictures 100 from a field of view during time periods known as frame durations. The successive pictures 100 form a video sequence. A picture 100 comprises two-dimensional grid(s) of pixels 100(x,y).

For color video, each color component is associated with a two-dimensional grid of pixels. For example, a video can include a luma, chroma red, and chroma blue components. Accordingly, the luma, chroma red, and chroma blue components are associated with a two-dimensional grid of pixels 100Y(x,y), 100Cr(x,y), and 100Cb(x,y), respectively. When the grids of two dimensional pixels 100Y(x,y), 100Cr(x,y), and 100Cb(x,y) from the frame are overlayed on a display device, the result is a picture of the field of view at the frame duration that the frame was captured.

Generally, the human eye is more perceptive to the luma characteristics of video, compared to the chroma red and chroma blue characteristics. Accordingly, there are more pixels in the grid of luma pixels 100Y(x,y) compared to the grids of chroma red 100Cr(x,y) and chroma blue 100Cb(x,y). In the MPEG 4:2:0 standard, the grids of chroma red 100Cr(x,y) and chroma blue pixels 100Cb(x,y) have half as many pixels as the grid of luma pixels 100Y(x,y) in each direction.

The chroma red 100Cr(x,y) and chroma blue 100Cb(x,y) pixels are overlayed the luma pixels in each even-numbered column 100Y(x, 2y) between each even, one-half a pixel below each even-numbered line 100Y(2x, y). In other words, the chroma red and chroma blue pixels 100Cr(x,y) and 100Cb(x,y) are overlayed pixels 100Y(2x+½, 2y).

Encoding standards, such as MPEG-2 and ITU-H.264 (also known as MPEG-4, Part 10, and Advanced Video Coding, and now referred to as H.264) use motion compensation to encode and compress video data. Motion compensation divides the picture 100 into blocks, and encodes the blocks on the basis of a similar block that was previously encoded, known as a reference block.

For example, MPEG-2 uses what are known as macroblocks. The luma pixels of the frame 100Y(x,y), or top/bottom fields 110YT/B(x,y) can be divided into 16×16 pixel 100Y (16x→16x+15, 16y→16y+15) blocks 115Y(x,y). For each block of luma pixels 115Y(x,y), there is a corresponding 8×8 block of chroma red pixels 115Cr(x,y) and chroma blue pixels 115Cb(x,y) comprising the chroma red and chroma blue pixels that are to be overlayed the block of luma pixels 115Y (x,y). A block of luma pixels 115Y(x,y), and the corresponding blocks of chroma red pixels 115Cr(x,y) and chroma blue pixels 115Cb(x,y) are collectively known as a macroblock 120. In H.264, the macroblocks 120 can be further divided into 16×8, 8×16, 8×8, 4×8, 8×4, and 4×4 blocks 130.

In MPEG-2, each macroblock 120, is compared to the pixels of other pictures for a similar block of pixels P. In H.264, each block 130 is compared to the pixels of other pictures for a similar block of pixels R. The similar block of pixels is known as the reference block R. The difference between the macroblock 120 or block 130 and the reference block R is known as the prediction error E. The prediction error E is calculated and encoded, along with an identification of the reference block R. The reference block R is identified by motion vectors MV. Motion vectors MV describe the spatial displacement between the macroblock 120 or block 130 and the reference block R.

In MPEG-2 and H.264, the prediction error E is transformed to the frequency domain, and quantized. A minimal prediction error E is desirable because it takes fewer bits to encode. Accordingly, it is desirable that the reference block R and the macroblock 120 or block 130 are similar.

Motion Estimation for MPEG-2 and H.264

Referring now to FIG. 5, there is illustrated a block diagram describing data words 505 in accordance with an embodiment of the present invention. In the present example, the prediction block P is a macroblock 120 comprising 16×16 pixels. The prediction block P is sampled by selecting every fourth pixel in the horizontal direction and every fourth pixel in the vertical direction. Accordingly, the samples include:

120(0, 0), 120(0, 4), 120(0, 8), 120(0, 12)
120(4, 0), 120(4, 4), 120(4, 8), 120(4, 12)
120(8, 0), 120(8, 4), 120(8, 8), 120(8, 12)
120(12, 0), 120(12, 4), 120(12, 8), 120(12, 12)

For each sampled line, 0, 4, 8, 12, the samples are concatenated, forming concatenated words 510(0), 510(1), 510(2), and 510(3). Each pixel is coded with a byte or eight bits. In the concatenated words 510, the four least significant bits for each concatenated sample are replaced with "don't cares", X, thereby forming the data words 505(0), 505(1), 505(2), and 505(3).

Figure 6:
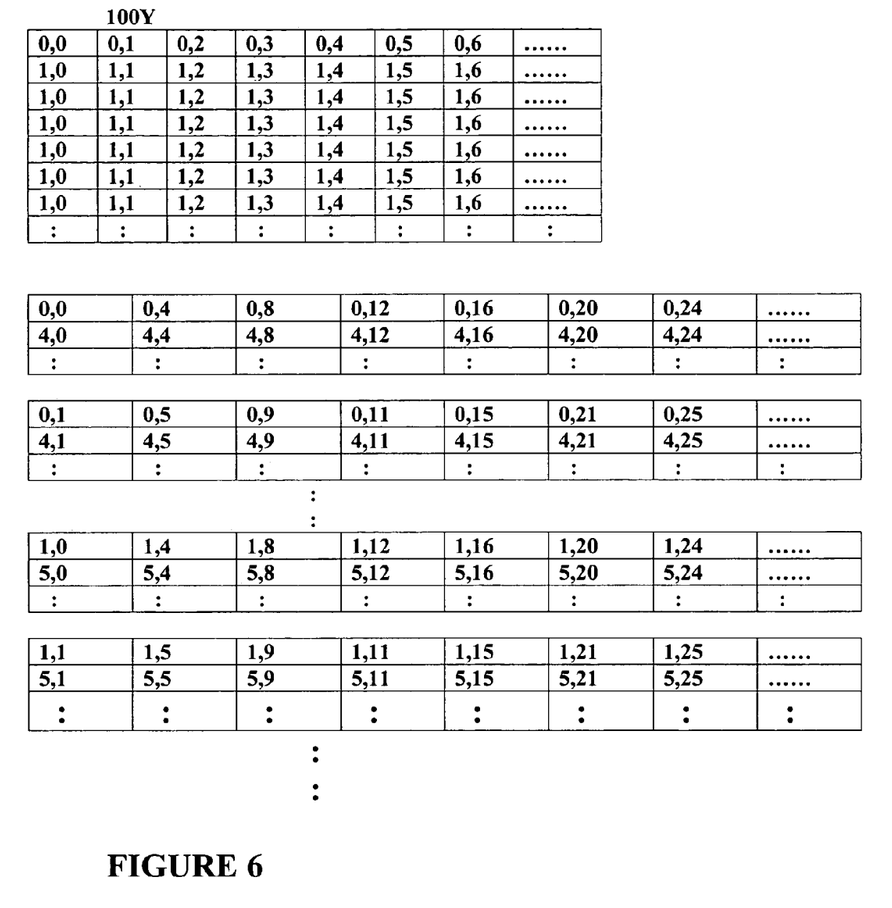
FIG. 6 is a block diagram of an exemplary video encoder in accordance with an embodiment of the present invention.

Referring now to FIG. 6, there is illustrated a block diagram describing a reference picture stored in memory in accordance with an embodiment of the present invention. The memory may be, but is not limited to, a TCAM memory. As noted above, the reference picture comprises luma, chroma red, and chroma blue components are associated with a two-dimensional grid of pixels 100Y(x,y), 100Cr(x,y), and 100Cb (x,y), respectively.

The luma pixels 100Y(x,y) from the reference picture are stored in a memory, such that each pixel is stored in memory consecutively with the fourth pixel in the horizontal direction, 100Y(x, y+4), where n=0, 1, 2, 3, . . . . The lines of luma pixels are stored in the memory, in an order every line 100Y(x, --) is stored following the fourth line above it 100Y(x-4, y). Accordingly, there will be sixteen sets of pixels, the pixels beginning from 100Y(0,0) , . . . 100Y(0,3), 100Y(3,0), . . . 100Y(3,3).

Additionally, the byte address of a line 100Y(x, y) is offset from the byte address of the next line in the order, 100Y(x+4, y) by an integer power of two. For example, where the reference picture is a high definition television (HDTV) picture, there are 1920 pixels in the horizontal direction. Accordingly, there will be 480 pixels in each line in a set. Therefore, the starting address of a line 100Y(x, --) and the subsequently stored line 100Y(x+4, --) can be offset by 512 bytes.

The data words 505 (0), 505 (1), 505 (2), 505 (3) are used to address the memory. Where the content of the memory matches the data words 505, the memory returns the starting byte addresses where the matching data word is stored.

The starting byte addresses returned for data word 505(0) indicates that line 0 of a block in the reference picture has pixels that are similar to the samples in the first line of the prediction block P.

The starting byte addresses returned for data word 505(1) indicates that line 4 of a block in the reference picture has pixels that are similar to the samples in the first line of the prediction block P.

The starting byte addresses returned for data word 505(2) indicates that line 8 of a block in the reference picture has pixels that are similar to the samples in the first line of the prediction block P.

The starting byte addresses returned for data word 505(3) indicates that line 12 of a block in the reference picture has pixels that are similar to the samples in the first line of the prediction block P.

As noted above, the byte address of a line 100Y(x, y) is offset from the byte address of the next line in the order, 100Y(x+4, y) by an integer power of two. Therefore, for each set of four addresses among the starting addresses returned for 505(0), 505(1), 505(2), and 505(3), where each are sequentially offset from each other by the integer power of two (i.e., the integer number of least significant bits are the same), the address for 505(0) is the starting address for a block that has pixels that are similar to all of the samples from the prediction block. The foregoing is a potential reference block.

Where there are multiple potential reference blocks, a single reference block from the multiple potential reference blocks can be narrowed down by progressively decreasing the number of don't cares in the data word(s) 505. According to certain aspects of the invention, when there are multiple potential reference block, the "don't care" in the most significant bit positions in the data word(s) can be replaced with corresponding bits of the samples. The new data word(s) 505 can then be used for addressing the memory.

Figure 7:
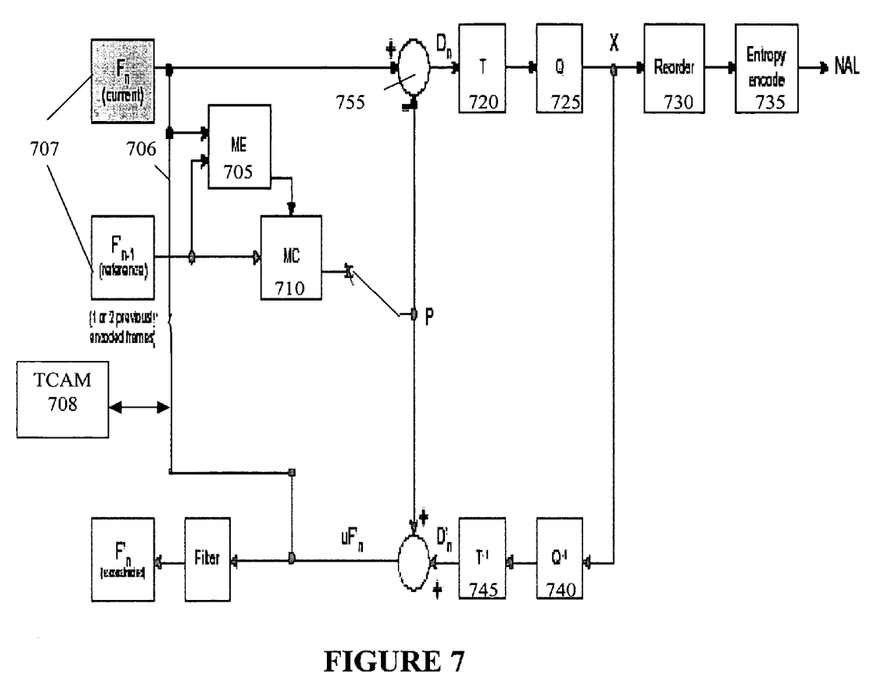
FIG. 7 is a block diagram describing an exemplary video encoder in accordance with an embodiment of the present invention.

Referring now to FIG. 7, there is illustrated a block diagram describing an exemplary video encoder in accordance with an embodiment of the present invention. The video encoder encodes video data and comprises a motion estimator 705, a bus 706, first TCAM memory 707, second TCAM memory 708, motion compensator 710, spatial predictor 715, transformation engine 720, quantizer 725, scanner 730, entropy encoder 735, inverse quantizer 740, and inverse transformation engine 745. The motion estimator 705, motion compensator 710, spatial predictor 715, transformation engine 720, quantizer 725, scanner 730, entropy encoder 735, inverse quantizer 740, and inverse transformation engine 745 can comprise hardware accelerator units under the control of a CPU.

When an input picture $100_n$ is presented for encoding, the video encoder processes the picture $100_n$ in units of macroblocks 120 or blocks 130. The video encoder can encode each macroblock 120 or block 130 using temporal prediction. The motion estimator 705 and motion compensator 710 select a reference block R from one or more reference frames. Additionally, the motion estimator 705 and motion compensator 710 provide motion vectors identifying the reference block.

A subtractor 755 subtracts the prediction block P from the macroblock 120 or block 130 in frame $F_n$, resulting in a prediction error E. Transformation engine 720 and quantizer 725 block transform and quantize the prediction error E, resulting in a set of quantized transform coefficients X. The scanner 730 reorders the quantized transform coefficients X. The entropy encoder 735 entropy encodes the coefficients. The video encoder also decodes the quantized transform coefficients X, via inverse transformation engine 745, and inverse quantizer 740, in order to reconstruct the frame $F_n$ for encoding later other frames.

According to certain aspects of the present invention, the motion estimator 705 can comprise a sampler, registers, and a controller as shown in FIG. 3. Additionally, in one embodiment of the present invention, the video encoder can operate as shown in FIG. 2.

The degree of integration of the encoder system will primarily be determined by speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor. In one representative embodiment, the encoder system is implemented as a single integrated circuit (i.e., a single chip design).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

The invention claimed is:

1. A method for encoding a picture, said method comprising:
   addressing, with a first one or more data words for a first prediction block, a first memory; and
   addressing, with one or more data words for a second prediction block, a second memory while addressing the first memory; and
   wherein the first memory and the second memory are content addressable memory;
   wherein addressing, with one or more data words for a first prediction block, a first memory further comprising:
      taking samples from the first prediction block wherein each of the samples comprises a plurality of bits, the plurality of bits comprising most significant bits and least significant bits;
      concatenating the samples from the first prediction block;
      replacing the least significant bits with "don't cares", thereby generating the one or more pixel data words; and
      addressing, with the one or more pixel data words, the first memory.

2. The method of claim 1, further comprising:
   generating one or more data words for a third prediction block, said one or more data words being a function of one or more samples from a third prediction block, while addressing the first memory.

3. The method of claim 1, further comprising:
   receiving one or more addresses from the first memory after addressing the first memory; and
   writing one or more blocks associated with the one or more addresses to the second memory.

4. The method of claim 3, further comprising:
   replacing a portion of the "don't cares" with a portion the least significant bits, thereby generating the another one or more data words for the first prediction block; and
   addressing the second memory with the one or more data words for the first prediction block.

5. A method for encoding a picture, said method comprising:
   addressing, with a first one or more data words for a first prediction block, a first memory; and
   generating one or more data words for a second prediction block while addressing the first memory with the one or more data words for the first prediction block, said one or more data words being a function of one or more samples from a second prediction block; and
wherein the first memory and the second memory are content addressable memory.

6. A method for encoding a picture, said method comprising:
   addressing, with a first one or more data words for a prediction block, a first memory;
   receiving one or more addresses from the first memory after addressing the first memory;
   writing one or more blocks associated with the one or more addresses to a second memory; and
   addressing, with another one or more data words for the prediction block, the second memory;
   taking samples from the prediction block wherein each of the samples comprises a plurality of bits, the plurality of bits comprising most significant bits and least significant bits;
   concatenating the samples from the prediction block; and
   replacing the least significant bits with "don't cares", thereby generating the data words for the prediction block.

7. The method of claim 6, further comprising:
   replacing a portion of the "don't cares" with a portion the least significant bits, thereby generating the another one or more data words for the first prediction block.

8. A video encoder for encoding a picture, said video encoder comprising:
   a first memory for storing pixels from a reference picture;
   a second memory for storing pixels from one or more blocks of the reference picture; and
   a bus for addressing, with a first one or more data words for a first prediction block, the first memory and for addressing, with one or more data words for a second prediction block, a second memory while addressing the first memory; and
   wherein the first memory and the second memory are content addressable memory; and
   a sampler for taking samples from the first prediction block wherein each of the samples comprises a plurality of bits, the plurality of bits comprising most significant bits and least significant bits; and
   wherein the register concatenates the samples from the first prediction block and replaces the least significant bits with "don't cares", thereby generating the one or more data words for the first prediction block.

9. The video encoder of claim 8, further comprising:
   a register for generating one or more data words for a third prediction block while the bus addresses the first memory, said one or more data words being a function of one or more samples from a third prediction block.

10. The video encoder of claim 8, wherein the bus receives one or more addresses from the first memory after addressing the first memory and wherein the second memory stores one or more blocks associated with the one or more addresses after receiving the one or more addresses.

11. The video encoder of claim 10, wherein the register replaces a portion of the "don't cares" with a portion the least significant bits, thereby generating the another one or more data words for the first prediction block and the bus addresses the second memory with the one or more data words for the first prediction block.

12. A video encoder for encoding a picture, said video encoder comprising:
   a first memory for storing a reference picture;
   a bus for addressing, with a first one or more data words for a prediction block, a first memory and receiving one or more addresses from the first memory after addressing the first memory; and
   a second memory for storing one or more blocks associated with the one or more addresses, after receiving the one or more addresses; and
   wherein the bus addresses, with another one or more data words for the prediction block, the second memory; and
   wherein the first memory and the second memory are content addressable memory;
   further comprising:
   a sampler for taking samples from the prediction block wherein each of the samples comprises a plurality of bits, the plurality of bits comprising most significant bits and least significant bits; and
   a register for concatenating the samples from the prediction block and replacing the least significant bits with "don't cares", thereby generating the data words for the prediction block.

13. The video encoder of claim 12, wherein the register replaces a portion of the "don't cares" with a portion the least significant bits, thereby generating the another one or more data words for the first prediction block.

14. The method of claim 1, wherein a first prediction error is generated from the first prediction block and a first block of reference pixels that are generated from data stored in the first memory, and a second prediction error is generated from the second prediction block and a second pixels that are generated from data stored in the second memory.

15. The method of claim 3, wherein receiving one or more addresses from the first memory after addressing the first memory comprises receiving one or more addresses from the first memory that store an equivalent value to the one or more data words for the first prediction block.

16. A video encoder for encoding a picture, said video encoder comprising:
   a first memory for storing a reference picture;
   a bus for addressing, with a first one or more data words for a prediction block, a first memory and receiving one or more addresses from the first memory after addressing the first memory; and
   a second memory for storing one or more blocks associated with the one or more addresses, after receiving the one or more addresses; and
   wherein the bus addresses, with another one or more data words for the prediction block, the second memory;
   wherein the first memory and the second memory are content addressable memory; and
   wherein the register replaces a portion of the "don't cares" with a portion the least significant bits, thereby generating the another one or more data words for the first prediction block.

* * * * *